United States Patent [19]

Nishina et al.

[11] 3,847,621
[45] Nov. 12, 1974

[54] LASER-SENSITIVE SILVER HALIDE PHOTOSENSITIVE MATERIAL

[75] Inventors: Yoshio Nishina; Isao Kono; Toshio Kamakura; Hayashi Nakamura; Noboru Fujimori, all of Tokyo; Eiichi Sakamoto, Hanno, all of Japan

[73] Assignee: Konishiroku Photo Industry Co. Ltd., Tokyo, Japan

[22] Filed: Nov. 27, 1972

[21] Appl. No.: 309,715

[30] Foreign Application Priority Data
Nov. 29, 1971 Japan.................. 46-99195

[52] U.S. Cl.................. 96/126, 96/107, 96/125
[51] Int. Cl................................ G03c 1/14
[58] Field of Search............... 96/125, 126

[56] References Cited
UNITED STATES PATENTS

| | | | |
|---|---|---|---|
| 2,533,426 | 12/1950 | Carroll et al.......... | 96/126 |
| 2,852,385 | 9/1958 | Jones................... | 96/126 |
| 2,977,229 | 3/1961 | Jones................... | 96/126 |
| 3,672,898 | 6/1972 | Schwan et al........... | 96/126 |

Primary Examiner—J. Travis Brown
Attorney, Agent, or Firm—Bierman & Bierman

[57] ABSTRACT

A laser-sensitive photosensitive material, having improved photographic characteristics and being quick treatable, is disclosed which is prepared by use of a silver halide emulsion containing 0.001 to 0.04 mole of silver iodide per mol of silver halide, and contains in an emulsion layer or protective layer a compound having the general formula (I)

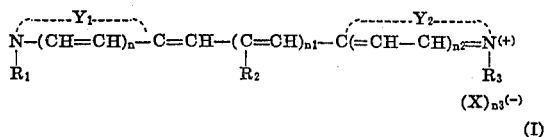

(I)

wherein $Y_1$ and $Y_2$ are individually a non-metallic atomic group necessary to form a nitrogen-containing heterocyclic ring of benzothiazole, benzoselenazole, naphthothiazole, naphthoselenazole or quinoline which heterocyclic ring may be substituted with halogen, lower alkyl or lower alkoxy; $R_1$ and $R_3$ are individually lower alkyl, carboxyalkyl, sulfoalkyl, hydroxyethyl, benzyl or sulfopropylthioethyl group; $R_2$ is hydrogen or lower alkyl; X is an anion; $n, n_1$ and $n_2$ are individually 0 or 1; and $n_3$ is 0 or 1 and 0 in case an intramolecular salt is formed; and at least one of compounds having the general formulas (II) to (VIII)

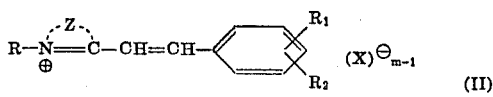

(II)

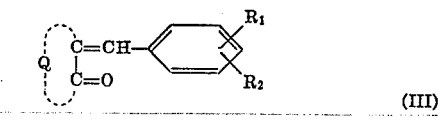

(III)

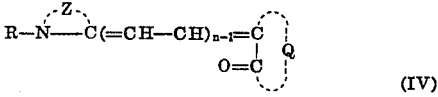

(IV)

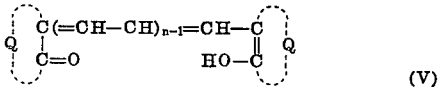

(V)

wherein Z is an atom or a group necessary to form a heterocyclic ring of thiazole, benzothiazole, naphthothiazole, oxazole, benzoxazole, naphthoxazole, selenazole, benzoselenazole, naphthoselenazole, 3,3-dialkylindolenine, benzimidazole, thiazoline, pyridine, or quinoline; Q is an atom or group necessary to form a heterocyclic ring of pyrazalone, barbituric acid, thiobarbituric acid, isoxazolone, 3-hydroxythionaphthene or 1,3-indandione; R is a lower alkyl group or a carboxyethyl, sulfobenzyl or sulfophenylethyl group; $R_1$ and $R_2$ are individually hydrogen or chlorine, or an alkyl, alkoxy, amino, acylamino, alkylamino, dialkylamino or sulfonic group; X is an acid anion; $m$ is 1 or 2; and $n$ is 1, 2 or 3;

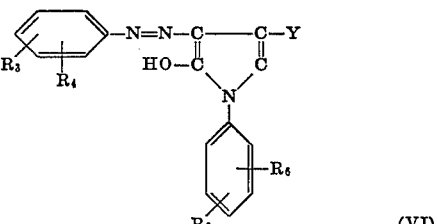

(VI)

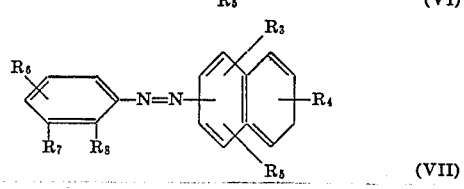

(VII)

wherein y is a hydrogen, or an alkyl, amino acylamino or carboxyl group; and $R_3$, $R_4$, $R_5$, $R_6$, $R_7$ and $R_8$ are individually hydrogen or chlorine, or a hydroxy, alkoxy, alkyl, amino, acylamino, alkylamino, sulfonic or carboxyl group, provided that $R_7$ and $R_8$ may form a benzene ring, and

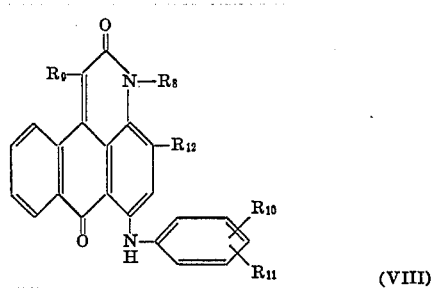

(VIII)

wherein $R_8$ is hydrogen or an alkyl group; $R_9$ is hydrogen, or an acyl or alkoxycarbonyl group; and $R_{10}$, $R_{11}$, and $R_{12}$ are individually hydrogen, or an alkyl or sulfonic group.

5 Claims, No Drawings

LASER-SENSITIVE SILVER HALIDE PHOTOSENSITIVE MATERIAL

This invention relates to a laser facsimile photosensitive material for use in facsimile telegraphy using a laser.

According to the conventional facsimile telegraphic process, an electric signal at the time of receiving has been converted into the intensity of light by means of a crater tube. This process, however has such disadvantages that the crater tube is not only great in light loss but also tends to undergo optical damage and is short in life.

In view of the above, there has recently been developed a process in which a laser, e.g., helium neon gas laser or semiconductor laser, is used in place of the crater tube.

In the case of facsimile telegraphy using such laser, a silver halide photosensitive material to be used therefor is required to have various characteristics. For example, the photosensitive material is required to be sensitive to the wavelength of light emitted therefrom and highly sensitive even when exposed for $10^{-3}$ to $10^{-7}$ seconds to a high luminance light. Further, the receiving of facsimile telegraph is required to be conducted in an extremely short period of time. Accordingly, a photosensitive material to be used therefor is also required to be developed quickly, and thus the properties of the photosensitive material are of importance as well. Moreover, in order to make the working efficiency favorable, there is required the use of a safe light as bright as possible.

The present invention provides a photosensitive material for use in such laser facsimile telegraphic process. That is, the invention provides a quickly treatable laser facsimile photosensitive material, which is prepared by use of a silver halide emulsion comprising 0.1 to 4.0 mole percent of silver iodide and $10^{-8}$ to $10^{-6}$ moles, per mole of said emulsion, of a water-soluble iridium salt, and which contains in the emulsion layer or protective layer a compound having the general formula (I),

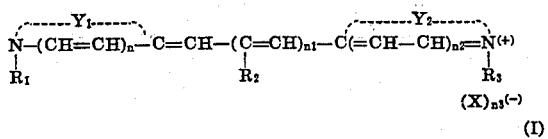

(I)

wherein $Y_1$ and $Y_2$ are individually a non-metal atom group necessary to form a nitrogen-containing heterocyclic ring of benzothiazole, naphthothiazole, benzoselenazole, naphthoselenazole or quinoline which heterocyclic ring may have been substituted with a halogen atom, or a lower alkyl or lower alkoxyl group; $R_1$ and $R_3$ are individually a lower alkyl, substituted alkyl, carboxyalkyl or sulfoalkyl group; $R_2$ is a hydrogen atom or a lower alkyl group; X is an anion; $n$, $n_1$ and $n_2$ are individually 0 or 1; and $n_3$ is 0 or 1 and is 0 in case an intramolecular salt is formed, and at least one of compounds having the general formulas (II) to (VIII),

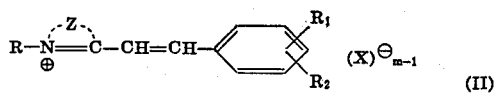

(II)

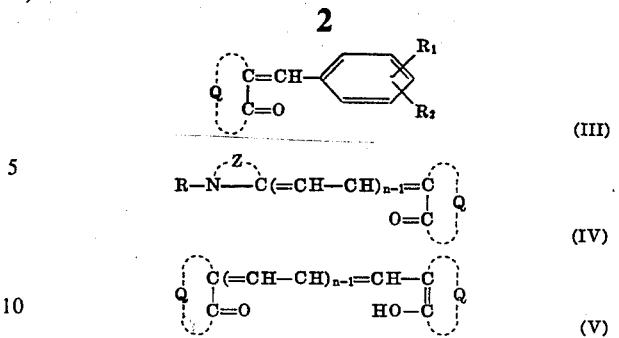

wherein Z is an atom group necessary to form a heterocyclic ring of thiazole, benzothiazole, naphthothiazole, oxazole, benzoxazole, naphthoxazole, selenazole, benzoselenazole, naphthoselenazole, 3,3-dialkylindolenine, benzimidazole, thiazoline, pyridine or quinoline; Q is an atom group necessary to form a heterocyclic ring of pyrazolone, barbituric acid, thiobarbituric acid, isoxazolone, 3-hydroxythionaphthene or 1,3-indandione; R is a substituted or unsubstituted alkyl group; $R_1$ and $R_2$ are individually a hydrogen or chlorine atom, or an alkyl, alkoxy, amino, acylamino, alkylamino, dialkylamino or sulfonic group; X is an acid anion; $m$ is 1 or 2; and $n$ is 1, 2 or 3,

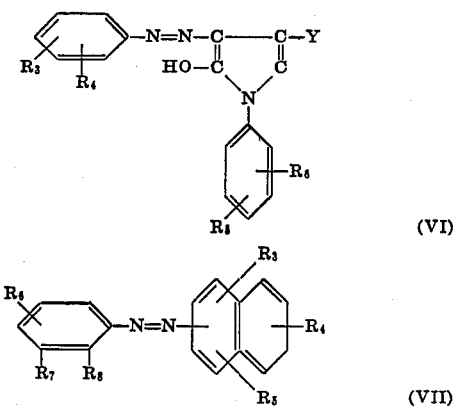

wherein Y is a hydrogen atom, or an alkyl, amino, acylamino or carboxyl group; and $R_3$, $R_4$, $R_5$, $R_6$, $R_7$ and $R_8$ are individually a hydrogen or chlorine atom, or a hydroxy, alkoxy, alkyl, amino, acylamino, alkylamino, sulfonic or carboxyl group, provided that $R_7$ and $R_8$ may form a benzene ring, and

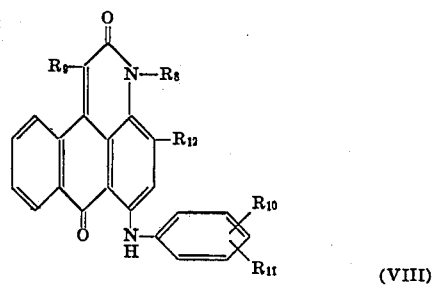

wherein $R_8$ is a hydrogen atom or an alkyl group; $R_9$ is a hydrogen atom, or an acyl or alkoxycarbonyl group; and $R_{10}$, $R_{11}$ and $R_{12}$ are individually a hydrogen atom, or an alkyl or sulfonic group.

The emulsion used in the present invention is a silver halide emulsion containing 0.3 to 4.0 mole percent of silver iodide, and the amount of binder used in the emulsion is preferably 50 to 100 g. per mole of the silver halide. The binder is used in said amount for such reason that the emulsion can be quickly dried at the time of quick treatment, and an emulsion containing more than 100 g. of binder is inferior in drying property. An emulsion containing no silver iodide becomes low in spectral gamma of laser light (more than 500 mμ) and is inferior in sensitivity, and an image formed by use of such emulsion is inferior in quality. In case the emulsion is incorporated with about $10^{-8}$ to $10^{-6}$ moles, per mole of silver halide, of a water-soluble iridium salt, the emulsion can be made higher in sensitivity. Typical examples of the water-soluble iridium salt used in the above case include $Na_3IrCl_6$ and $Na_2IrCl_6$.

Concrete examples of the compound having the aforesaid general formula (I) which is to be added to the emulsion are as follows:

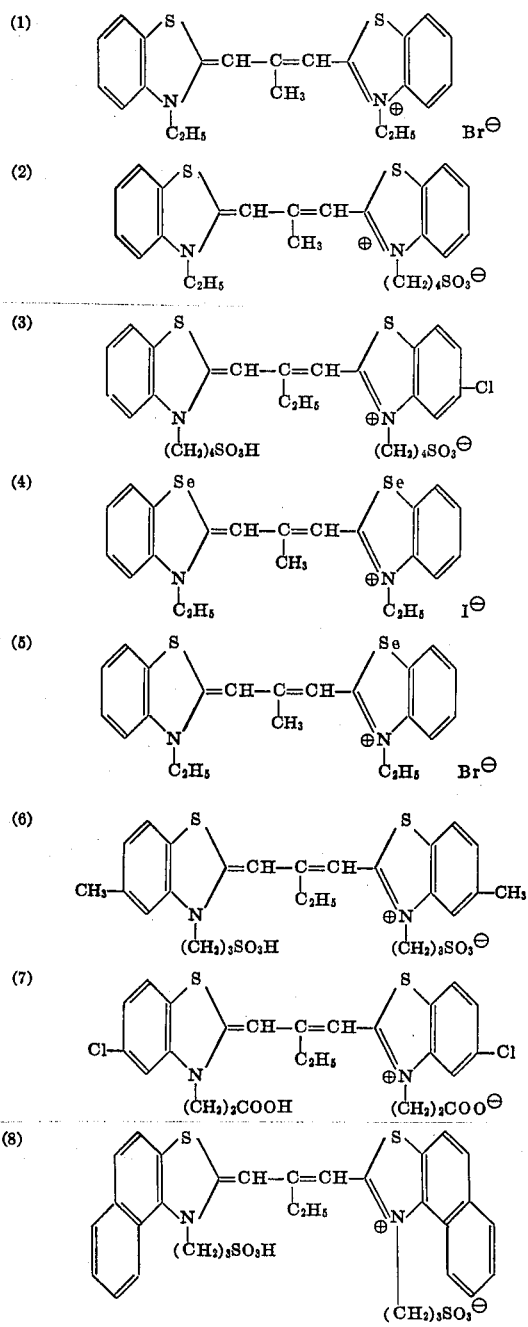

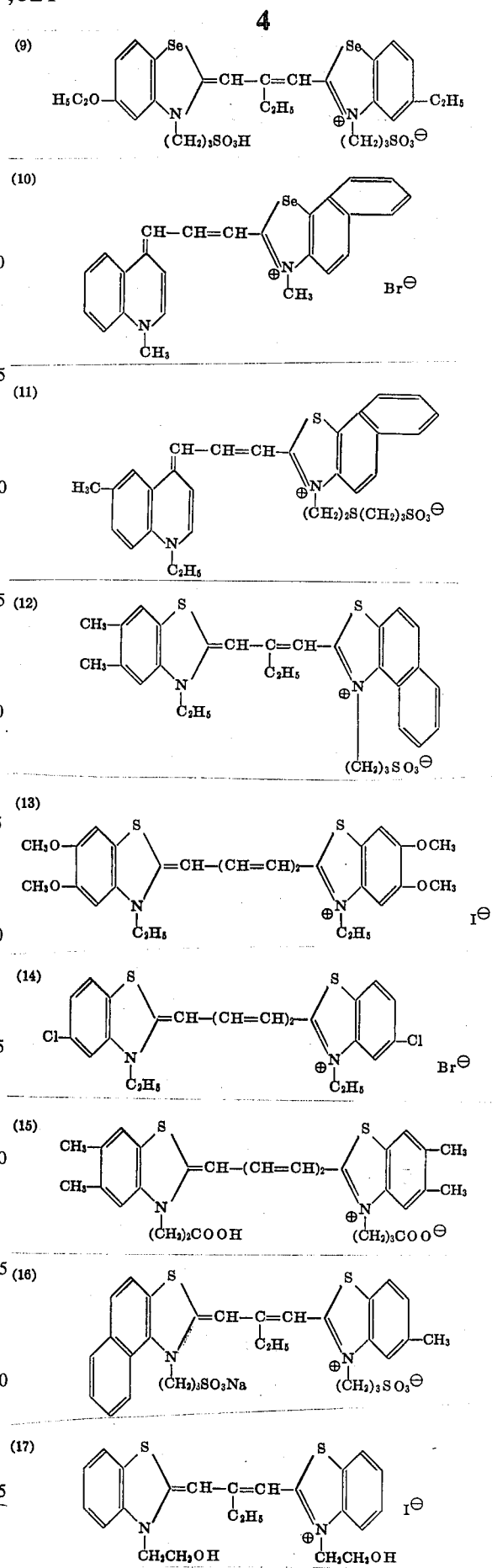

(18) 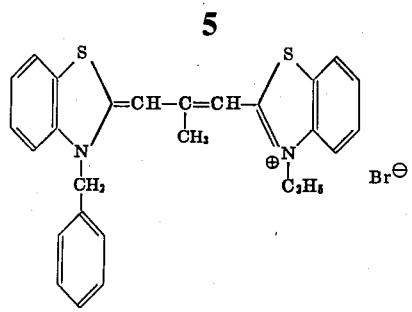

5. 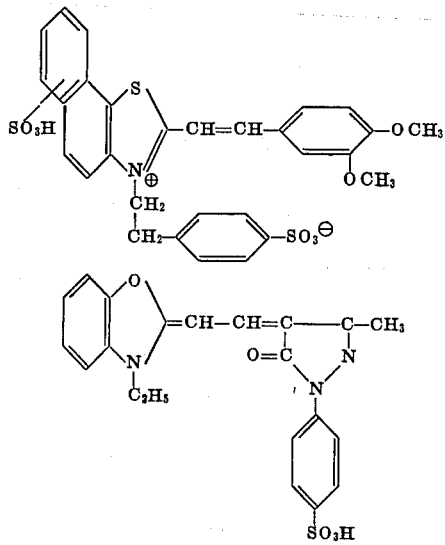

6. 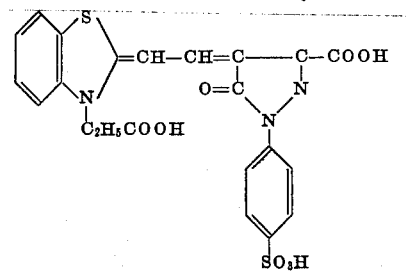

Ordinarily, the compound of the general formula (I) may be added at a stage during or after the second ripening, and the amount thereof is 5 to 500 mg., preferably 20 to 100 mg., per mole of silver halide. It is not objectionable at all to use a mixture of compounds of the general formula (I).

The compound of the general formulas (II) to (VIII) is incorporated into the emulsion layer and/or protective layer. In case the compound is desired to be incorporated into the emulsion layer, it may be added to the emulsion after completion of the second ripening, and in case the compound is desired to be incorporated into the protective layer, it may be added at any stage before coating. The amount of the compound to be added is 100 mg. to 3.0 g. per $m^2$. Concrete examples of the compounds having the general formulas (II) to (VIII) are as follows:

1. 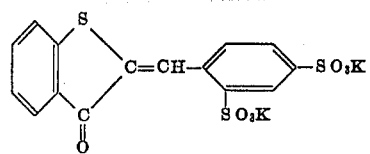

2. 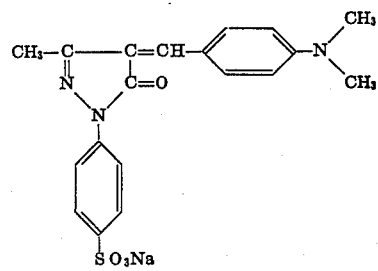

3. 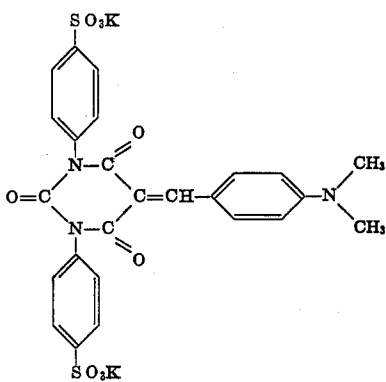

4. 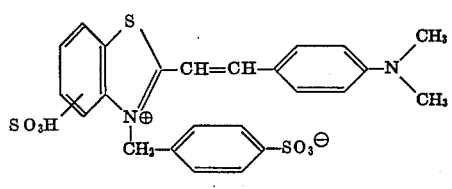

7. 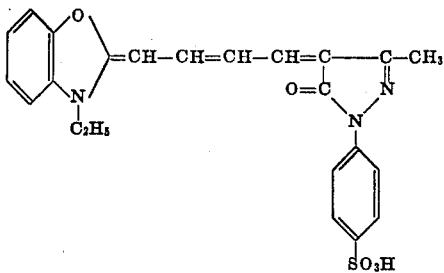

8. 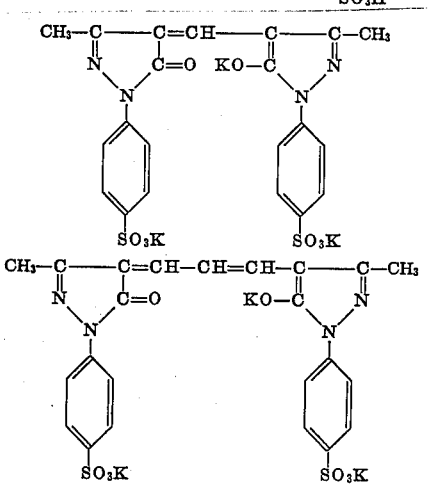

9. 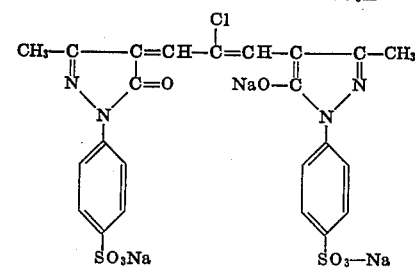

10. 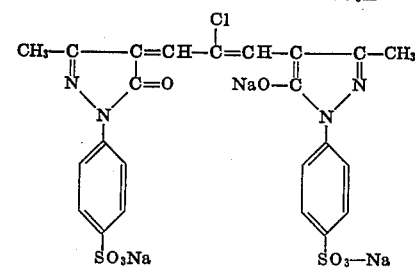

11.

12. 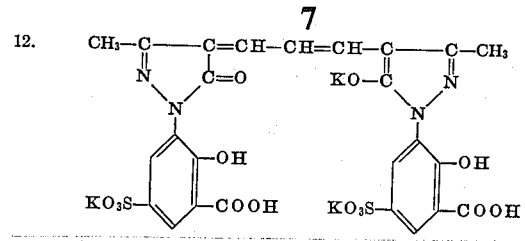
13. 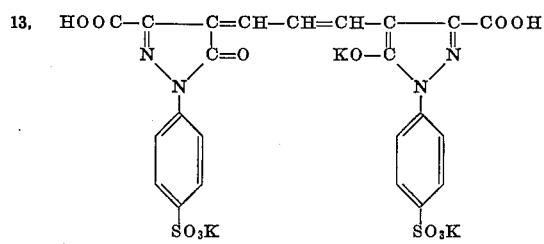
14. 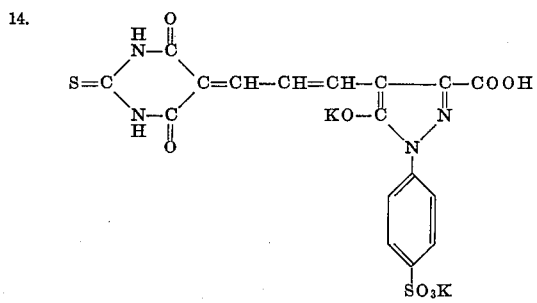
15. 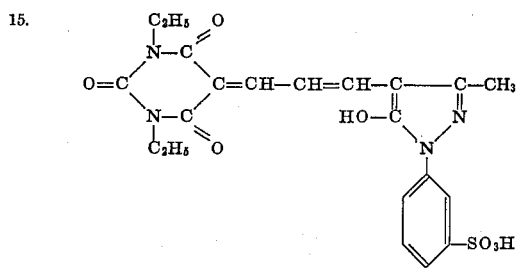
16. 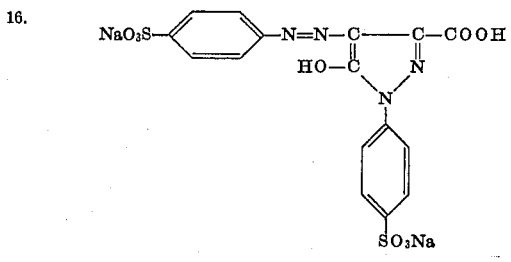
17. 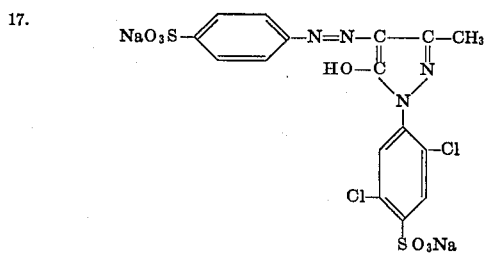
18. 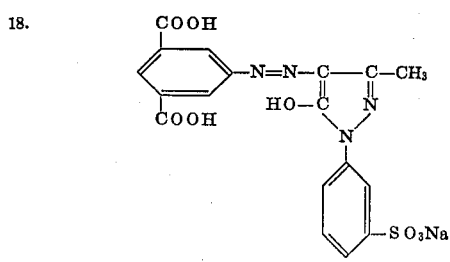
19. 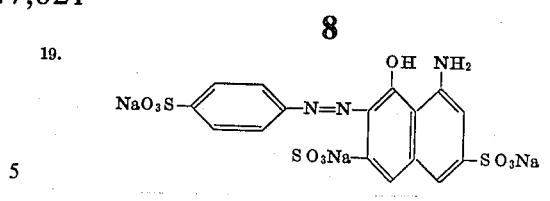
20. 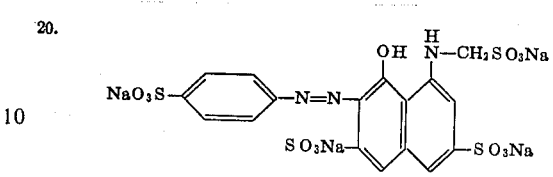
21. 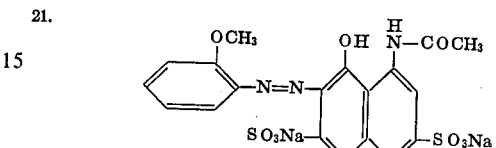
22. 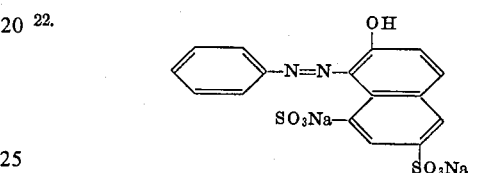
23. 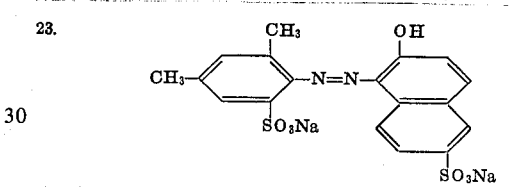
24. 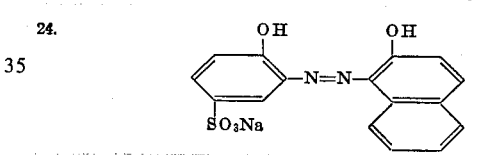
25. 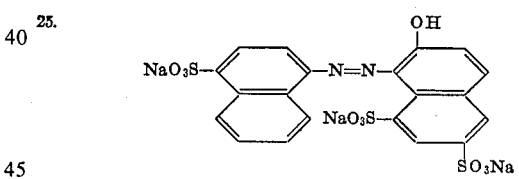
26. 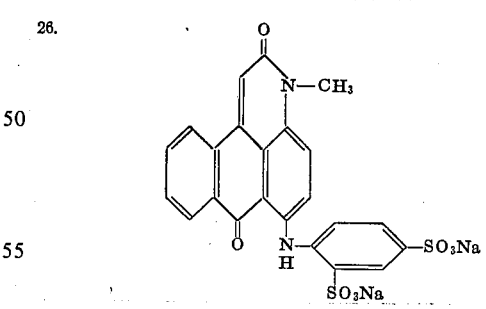
27. 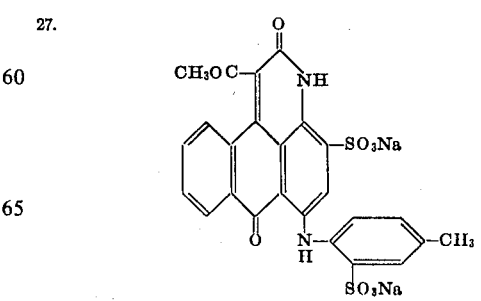

28. 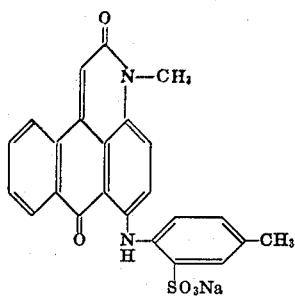

29. 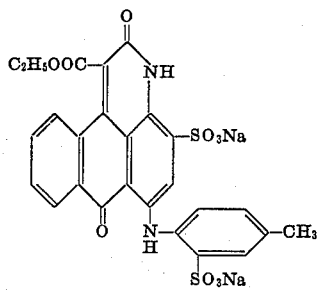

30. 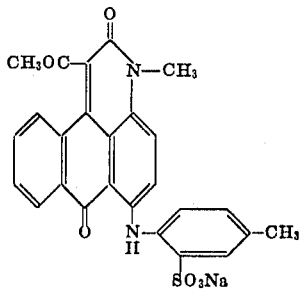

The laser facsimile photosensitive material of the present invention shows a high sensitivity when exposed for a short period of time (e.g. $10^{-5}$ to $10^{-7}$ seconds) to a high luminance laser, e.g. a helium neon gas laser (632.8 m$\mu$) or semiconductor laser (690 m$\mu$), as is clear from the working examples shown later. Moreover, it decreases the sensitivity of unnecessary photosensitive wavelength region (400 to 600 m$\mu$), and can be used under a bright safety light, e.g., a green or yellowish green safety light, to make it possible to enhance the working efficiency. Even when treated with a developer for high temperature quick treatment, the photosensitive material can be quickly treated without any substantial formation of fog.

The present invention is illustrated below with reference to examples.

EXAMPLE 1

A silver iodobromide emulsion containing 0.5 mole percent of silver iodide was incorporated with $10^{-7}$ moles, per mole of the silver halide, of $Na_3IrCl_6$ to prepare a sample A. On the other hand, the above-mentioned silver iodobromide emulsion was used as it was as a sample B. The two samples A and B were individually incorporated with 60 mg., per mole of the silver halide, of the exemplified compound (8) having the general formula (I) and equally divided into two portions to form four emulsions. Two of the four emulsions thus formed were individually coated as they were on a support to prepare samples A-1 and B-1, and the other two of the four emulsions were individually incorporated with 9 g., per mole of the silver halide, of the exemplified compound 25 having the general formula (VII) and coated on a support to prepare samples A-2 and B-2 (the amount of the exemplified compound 25 was 0.5 g/m²).

These samples were individually exposed for $10^{-5}$ seconds to a helium neon gas laser, developed and then measured in density. On the other hand, the samples unexposed to the laser were allowed to stand for 0 and 5 seconds under a 20W green safety light (Sakura Safety Light No. 5A-½; produced by Konishiroko Photo Industry Co., Ltd.) at a distance of 1 m. The results obtained were as set forth in Table 1.

Table 1

| Sample | Density to laser light | Fog due to safety light | |
|---|---|---|---|
| | | 0 second | 5 seconds |
| A-1 | 3.5 | 0.06 | 2.7 |
| A-2 | 3.3 | 0.06 | 0.07 |
| B-1 | 2.8 | 0.06 | 2.5 |
| B-2 | 2.5 | 0.06 | 0.06 |

The exemplified compound 25 was replaced by each of the exemplified compounds 8, 10, 15 and 26 to obtain similar results.

EXAMPLE 2

A silver chloroiodide emulsion containing 2 mole percent of silver iodide and 5 mole percent of silver chloride was incorporated with 50 mg., per mole of the silver halide, of the exemplified compound (14) having the general formula (I), and then coated on a support to prepare a sample. The thus prepared sample was equally divided into two, and one of the divided samples was coated with a protective layer, which had been incorporated with the exemplified compound 13 having the general formula (V) so that the amount of the coated compound became 0.2 g/m², to prepare a sample C-1, while the other of the divided samples was coated with a protective layer, which had been incorporated with no such compound, to prepare a sample C-2. These samples were subjected to the same measurement as in Example 1 to obtain the results as set forth in Table 2.

Table 2

| Sample | Density to laser light | Fog due to safety light | |
|---|---|---|---|
| | | 0 second | 5 seconds |
| C-1 | 2.6 | 0.06 | 0.08 |
| C-2 | 3.0 | 0.06 | 2.6 |

EXAMPLE 3

Emulsions D and E prepared in the same manner as in the case of the samples A and B used in Example 1 were individually incorporated with 70 mg., per mole of the silver halide, of the exemplified compound (4) having the general formula (I), and then coated on a support to prepare samples. The samples were equally divided into two to prepare four samples. Two of the four samples were individually coated with a protective layer, which had been incorporated with a 1:1 mixture of the exemplified compound (4) having the general formula (II) and the exemplified compound (16) having the general formula (VI) so that the amount of the coated mixture became 0.6 g/m², to prepare samples D-1 and D-1, while the other two of the four samples were individually coated with a protective layer, which had been incorporated with no such mixture, to prepare samples D-2 and E-2. These samples were subjected to the same measurement as in Example 1 to obtain the results as set forth in Table 3. Provided that the safety light used was a yellowish green safety light glass which was brighter than the safety light used in Example 1.

Table 3

| Sample | Density to laser light | Fog due to safety light | |
|---|---|---|---|
| | | 0 second | 5 seconds |
| D-1 | 3.4 | 0.06 | 0.08 |
| D-2 | 3.8 | 0.06 | 3.0 |
| E-1 | 2.3 | 0.06 | 0.07 |
| E-2 | 2.9 | 0.06 | 2.8 |

What we claim is:

1. A quick treatable, laser-sensitive photosensitive material comprising a silver halide emulsion containing 0.1 to 4.0 mole percent of silver iodide, which material contains in an emulsion layer or protective layer a compound having the general formula (I),

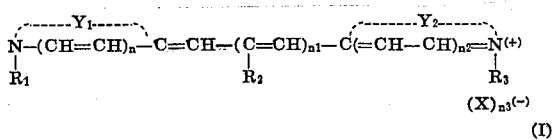

wherein $Y_1$ and $Y_2$ are individually a non-metallic atomic group necessary to form a nitrogen-containing heterocyclic ring of benzothiazole, benzoselenazole, naphthothiazole, naphthoselenazole, or quinoline which heterocyclic ring may have been substituted with a halogen atom, or a lower alkyl or lower alkoxyl group; $R_1$ and $R_3$ are individually a lower alkyl, carboxyalkyl, sulfoalkyl, hydroxyethyl, benzyl or sulfopropylthioethyl group; $R_2$ is hydorgen or a lower alkyl group; X is an anion; $n$, and $n_2$ are individually 0 or 1; $n_1$ is 1; and $n_3$ is 0 or 1 and 0 in case an intramolecular salt is formed; and at least one compound having the general formula (II) to (VIII),

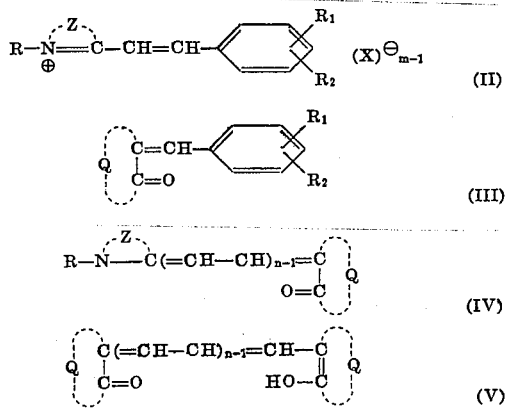

wherein Z is an atom or group necessary to form a heterocyclic ring of thiazole, benzothiazole, naphthothiazole, oxazole, benzoxazole, naphthoxazole, selenazole, benzoselenazole, naphthoselenazole, 3,3-dialkylindolenine, benzimidazole, thiazoline, pyridine, or quinoline; Q is an atom or group necessary to form a heterocyclic ring of pyrazolone, barbituric acid, thiobarbituric acid, isoxazolone, 3-hydroxythionaphthene or 1,3-indandione; R is a lower alkyl, carboxyethyl, sulfobenzyl, or sulfophenylethyl group; $R_1$ and $R_2$ are individually hydrogen or chlorine, or an alkyl, alkoxy, amino, acylamino, alkylamino, dialkylamino or sulfonic group; X is an acid anion; $m$ is 1 or 2; and $n$ is 1,2 or 3;

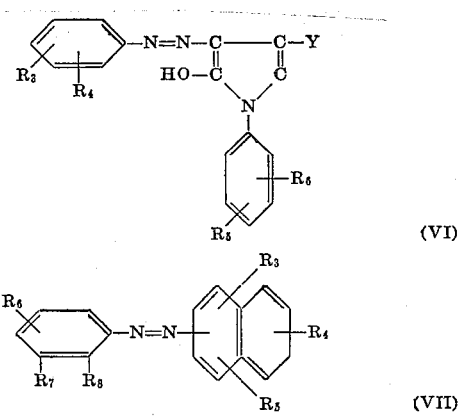

wherein Y is hydrogen, or an alkyl, amino, acylamino or carboxyl group; and $R_3$, $R_4$, $R_5$, $R_6$, $R_7$ and $R_8$ are individually hydrogen or chlorine, or a hydroxy, alkoxy, alkyl, amino, acylamino, alkylamino, sulfonic or carboxyl group, provided that $R_7$ and $R_8$ may form a benzene ring, and

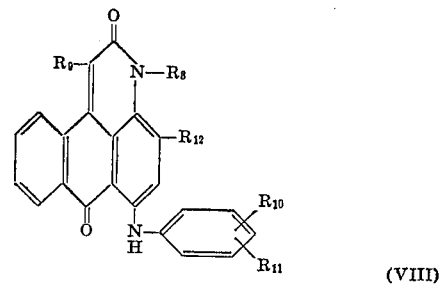

wherein $R_8$ is hydrogen or an alkyl group; $R_9$ is hydrogen, or an acyl or alkoxycarboxyl group; and $R_{10}$, $R_{11}$, and $R_{12}$ are individually hydrogen, or an alkyl or sulfonic group.

2. A quick treatable, laser-sensitive photosensitive material comprising a silver halide emulsion containing 0.1 to 4.0 mole percent of silver iodide, which material has $10^{-8}$ to $10^{-6}$ moles, per mole of the silver halide, of water-soluble iridium salt incorporated therein, and contains in an emulsion layer or protective layer a compound having the general formula (I),

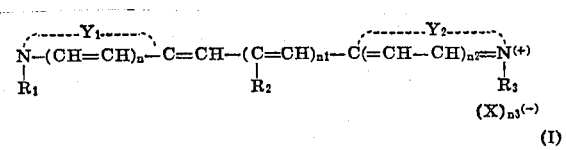

wherein $Y_1$ and $Y_2$ are individually a non-metallic atomic group necessary to form a nitrogen-containing heterocyclic ring of benzothiazole, benzoselenazole, naphthothiazole, naphthoselenazole, or quinoline which heterocyclic ring may have been substituted with a halogen atom, or a lower alkyl or lower alkoxyl group; $R_1$ and $R_3$ are individually a lower alkyl, carboxyalkyl, sulfoalkyl, hydroxyethyl, benzyl or sulfopropylthioethyl group; $R_2$ is hydrogen or a lower alkyl group; X is an anion; $n, n_1$ and $n_2$ are individually 0 or 1; and $n_3$ is 0 or 1 and 0 in case an intramolecular salt is formed; and at least one compound having the general formula (II) to (VIII),

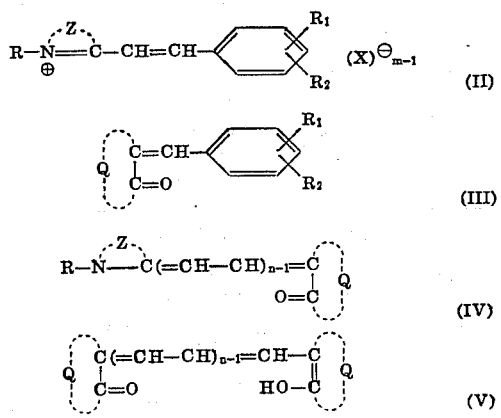

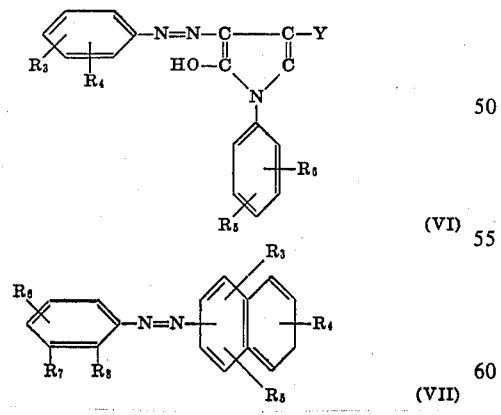

wherein Z is an atom or group necessary to form a heterocyclic ring of thiazole, benzothiazole, naphthothiazole, oxazole, benzoxazole, naphthoxazole, selenazole, benzoselenazole, naphthoselenazole, 3,3-dialkylindolenine, benzimidazole, thiazoline, pyridine, or quinoline; Q is an atom or group necessary to form a heterocyclic ring of pyrazolone, barbituric acid, thiobarbituric acid, isoxazolone, 3-hydroxythionaphthene or 1,3-indandione; R is a lower alkyl, carboxyethyl, sulfobenzyl, or sulfophenylethyl group; $R_1$ and $R_2$ are individually hydrogen or chlorine, or an alkyl, alkoxy, amino, acylamino, alkylamino, dialkylamino or sulfonic group; X is an acid anion; m is 1 or 2; and n is 1,2 or 3;

wherein Y is hydrogen, or an alkyl, amino, acylamino or carboxyl group; and $R_3$, $R_4$, $R_5$, $R_6$, $R_7$ and $R_8$ are individually hydrogen or chlorine, or a hydroxy, alkoxy, alkyl, amino, acylamino, alkylamino, sulfonic or carboxyl group, provided that $R_7$ and $R_8$ may form a benzene ring, and

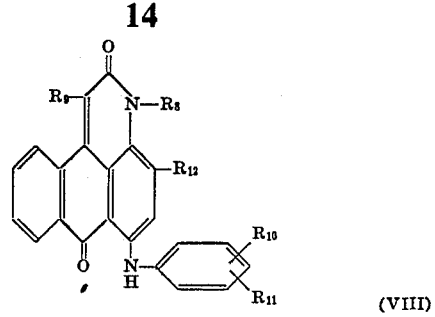

wherein $R_8$ is hydrogen or an alkyl group; $R_9$ is hydrogen, or an acyl or alkoxycarboxyl group; and $R_{10}$, $R_{11}$, $R_{12}$ are individually hydrogen, or an alkyl or sulfonic group.

3. A laser-sensitive photosensitive material comprising a silver halide emulsion containing 0.1 to 4.0 mole percent of silver iodide, which material contains, in the emulsion layer or protective layer, a compound having the following chemical structure:

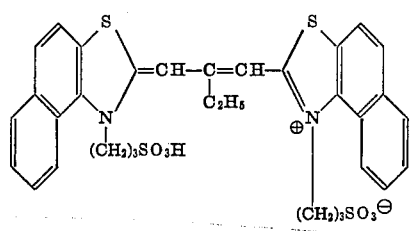

and at least one of the following compounds:

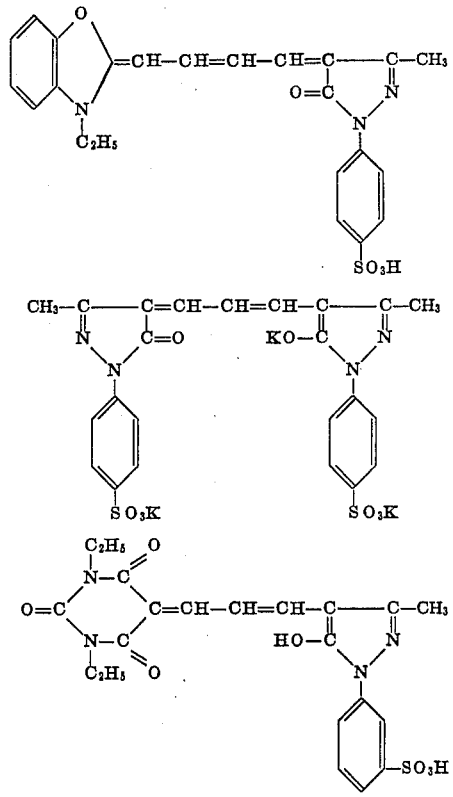

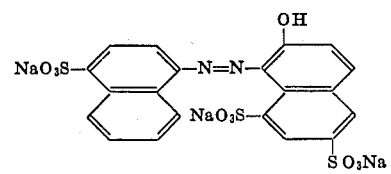

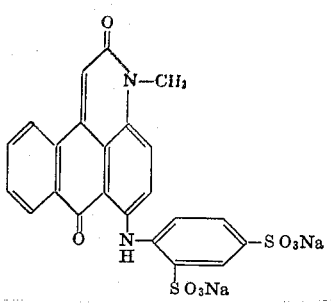

4. A laser-sensitive photosensitive material comprising a silver halide emulsion containing 0.1 to 4.0 mole percent of silver iodide, which material contains, in the emulsion layer of protective layer, a compound having the following chemical structure:

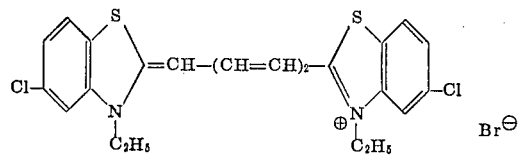

and a compound having the following chemical structure:

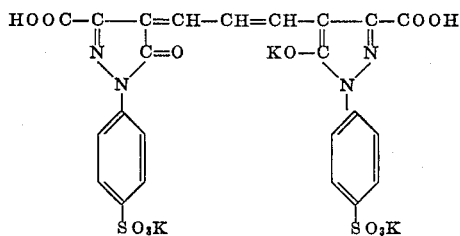

5. A laser-sensitive photosensitive material comprising a silver halide emulsion containing 0.1 to 4.0 mole percent of silver iodide, which material contains, in the emulsion layer or protective layer, the following compounds:

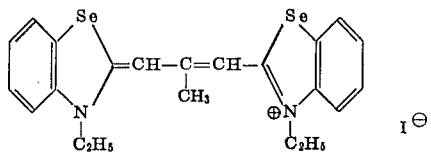

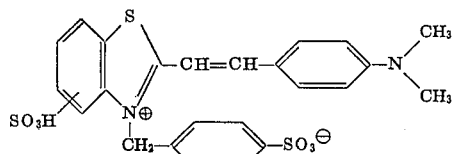

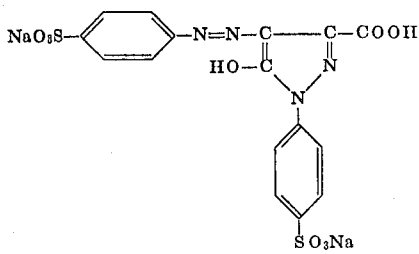

* * * * *